(12) United States Patent
Schatzmayr

(10) Patent No.: US 8,995,999 B2
(45) Date of Patent: Mar. 31, 2015

(54) DISTRIBUTED NETWORK REGISTER

(75) Inventor: Rainer Schatzmayr, Bonn (DE)

(73) Assignee: Deutsche Telecom AG, Bonn (DE)

( * ) Notice: Subject to any disclaimer, the term of this patent is extended or adjusted under 35 U.S.C. 154(b) by 420 days.

(21) Appl. No.: 13/377,086

(22) PCT Filed: Jul. 21, 2010

(86) PCT No.: PCT/EP2010/004466
§ 371 (c)(1),
(2), (4) Date: Dec. 20, 2011

(87) PCT Pub. No.: WO2011/009607
PCT Pub. Date: Jan. 27, 2011

(65) Prior Publication Data
US 2012/0108237 A1 May 3, 2012

(30) Foreign Application Priority Data
Jul. 21, 2009 (DE) .......................... 10 2009 034 285

(51) Int. Cl.
*H04L 1/00* (2006.01)
*H04W 4/00* (2009.01)
(Continued)

(52) U.S. Cl.
CPC ........ *H04L 67/104* (2013.01); *H04L 29/12188* (2013.01); *H04L 61/1582* (2013.01); *H04L 61/1588* (2013.01); *H04L 67/1065* (2013.01)
USPC .......................... 455/435.1; 370/218; 370/400

(58) Field of Classification Search
CPC ..................... H04L 29/12188; H04L 61/1582; H04L 61/1588; H04L 67/104; H04L 67/1065
USPC .................................. 455/435.1; 370/218, 400
See application file for complete search history.

(56) References Cited

U.S. PATENT DOCUMENTS 7,984,183 B2  7/2011 Andersen

2008/0181200 A1  7/2008 Leygues
(Continued)

FOREIGN PATENT DOCUMENTS

EP  0669774 A  8/1995

OTHER PUBLICATIONS

China Mobile,ZTE, Discussion on Distributed HSS solution, Agenda item 8.7.2 Release IMS_evol/Rel-93GPP TSG SA WG2 Meeting # 71, Feb. 16-20, 2009, Budapest, Hungary.
(Continued)

*Primary Examiner* — Opiribo Georgewill
(74) *Attorney, Agent, or Firm* — Andrew Wilford

(57) ABSTRACT

The invention relates to a method for operating a telecommunications network and a telecommunications network for mobile telecommunication, having a network register in which identifier of mobile terminals and network-related user data of the terminals are stored. The network register is formed from a peer-to-peer network having a multiplicity of decentralized register nodes which are networked with one another and are each associated with a geographic region. Hash tables are held in the register nodes, in which hash tables the identifiers of the terminals are stored as hash values and the user data is stored associated with these hash values. The network has at least a first node associated with a geographic region at which a terminal can register, and a second node, which is permanently assigned to the terminal and is associated with a geographic region. The terminal registers with the first node by transmitting the identifier, when it is located in the first region. The first node then determines network-related user data of the mobile terminal on registration, and determines the hash value for that identifier. This hash value is used to determine the second node. The first node either transmits the network-related user data to this second node or itself stores this user data in his hash table together with the hash value and transmits only its own address in the network to the second node. Either the network-related user data or the address of the first node is then stored, associated with the hash value, in the hash table of the second node.

3 Claims, 2 Drawing Sheets

(51) Int. Cl.
*H04L 12/26* (2006.01)
*H04L 12/28* (2006.01)
*H04L 12/16* (2006.01)
*H04L 29/08* (2006.01)
*H04L 29/12* (2006.01)

(56) References Cited

U.S. PATENT DOCUMENTS

2008/0225780 A1   9/2008   McCormick
2009/0196169 A1*  8/2009   Shi et al. .................. 370/218
2011/0010578 A1   1/2011   Agundez

OTHER PUBLICATIONS

Shou-Chih Lo, Journal of Information Science and Engineering 23, 421-439(2007), Wireless Communications Networks, Paris, France Oct. 25-27, 2004.

* cited by examiner

US 8,995,999 B2

DISTRIBUTED NETWORK REGISTER

CROSS REFERENCE TO RELATED APPLICATIONS

This application is the US-national stage of PCT application PCT/EP2010/004466 filed 21 Jul. 2010 and claiming the priority of European patent application 102009034285.0 itself filed 21 Jul. 2009.

FIELD OF THE INVENTION

The present invention relates to a method for operating a telecommunications network for mobile telecommunication, having a network register in which identifiers of mobile terminals and network-related user data of the terminals are stored, wherein the network register is formed from a peer-to-peer network having a multiplicity of decentralized register nodes that are networked with one another and are each associated with a geographic region, and wherein hash tables are held in the register nodes in which hash tables the identifiers of the terminals are stored as hash values and the user data is stored associated with these hash values. The invention furthermore relates to a telecommunications network for carrying out the method.

BACKGROUND OF THE INVENTION

For operation of a mobile radio network it is known to use a so-called home location register (HLR) in order to reach and to localize the terminals of mobile radio subscribers in the mobile radio network. The home location register is a central database that is an essential component of a mobile radio network. The mobile radio terminals are stored with the associated phone numbers (MSISDN, mobile subscriber ISDN), their status, that is to say whether or not they are registered in the mobile radio network, and their current location. In order to set up a communication link between a first mobile radio terminal and a second mobile radio terminal, the home location register is first of all checked to determine whether the second mobile radio terminal is registered in the mobile radio network. If this is the case, the register determines the cell in which the subscriber to be called is located, that is to say where it is registered, and the call is routed to the respective radio cell of the mobile radio network. The terminal is then reached, and can accept the call.

This technology that is currently used by the mobile radio operators, leads to an extremely large central database that manages the network-related user data of all subscribers in the mobile telecommunications network. This database is associated with a temporary buffer store, the so-called visitor location register (VLR) that is located in a mobile switching center (MSC) of a cell, and in which user data are stored for those mobile radio terminals that are currently located in the geographic coverage area of that switching center. The home location register and the visitor location register furthermore contain user's main data, by means of which authorization verifications can be obtained for authentication purposes. Further information relating to the home location register and the visitor location register is defined in international Standards, as specified by the European Telecommunications Standards Institute (ETSI) or the 3rd Generation Partnership Project (3GPP).

The so-called home subscriber service (HSS) represents a further development of the home location register (HLR). This is a database that is used for authentication and authorization of users within the so-called IP multimedia subsystem (IMS). The IMS is a collection of specifications of the 3GPP, with the purpose of standardizing access to services based on different network technologies. The home subscriber server therefore provides similar functions as the home location register, although these functions have been developed specifically for Internet-protocol (IP)-based networks. The home subscriber server comprises user data such as user profiles, data for user authentication and data relating to the location of the user within the network. The home subscriber server is also implemented as a central entity with a large database in the network.

The disadvantage of such central databases is obvious. On one hand, an enormous size is required for the databases, in order to store the user data of all network subscribers. This results in high hardware costs and considerable technical complexity, in order to provide the memory capacity and the high data transfer rate for simultaneous access to a plurality of user data items in the database. On the other hand, a central database involves a considerable failure risk, with the communication throughout the entire network collapsing if the database fails.

In the field of wired IP (Internet Protocol)-based networks, so-called peer-to-peer networks are known, in which all the network nodes have equal authority and are connected to one another, and in which data is stored in a correspondingly decentralized form, distributed across the network. Central entities such as databases for storage of user data can be saved in this way. When using this technology, the user data is stored in the terminals that are used for communication, that is to say the computers that are connected to the network.

So-called distributed hash tables are used to store and find data. These are used to find data elements in a large data set, by providing an index structure in the form of a table. Distributed hash tables (DHT) make it possible to distribute data objects as uniformly as possible across all the nodes, allowing routing to a specific network node, independently of the location of a certain entry point.

Consistent hash functions form the basis of distributed hash tables and are used to allocate keys in a linear value range to the data objects. In this case, the value range is distributed as uniformly as possible between the network nodes of the node quantity, with each node being responsible for at least one subspace of the key space. In the hash tables, information is stored in the form of a data pair comprising the key, also referred to as the hash value, and information associated with it. When a search is carried out for a specific data object in a peer-to-peer network, this can be done by means of distributed hash tables such that the hash function is used to calculate a hash value for the name (identifier) that identifies the data object, which hash value contains the memory location of the data object in the network, thus making it possible to search for the data object at the correct location. With the name converted to a hash value, distributed hash tables represent an efficient mechanism for storage and finding of information items associated with the hash value.

OBJECT OF THE INVENTION

The object of the present invention is to provide a method for operating a telecommunications network for mobile telecommunication, and to provide a corresponding telecommunications network that offers a high degree of fail-safety with reduced costs and less technical complexity for the storage of network-related user data in a network register that manages such data.

SUMMARY OF THE INVENTION

According to the invention, a method is proposed for operating a telecommunications network for mobile telecommunication, having a network register in which identifiers of mobile terminals for communication via the telecommunications network and network-related user data of the terminals are stored, wherein the network register is formed from a peer-to-peer network having a multiplicity of decentralized register nodes that are networked with one another and are each associated with one geographic region, wherein hash tables are held in the register nodes, in which hash tables the identifiers of the terminals are stored as hash values, and user data is stored associated with these hash values.

This results in a distributed network register, referred to in the following text as a DNR (Distributed Network Registry) that is formed from a distributed database, with each register node holding and managing a part of the database content and thus participating in the distributed network register. In this case, the concept of the distributed network register comprises two main functions, specifically the storage of user-related network data in a memory device, and the finding and provision of this user data that are stored in a database of a register node. These two functions are independent of one another, and may be realized in different forms.

The information, that is to say the network-related user data that is provided in the distributed network register can be used for various purposes, for example for localization of a network subscriber in order to set up a voice communication, for preparation for a media change, also referred to as a handover from one network technology to another, for preparing of a media change from one antenna to another, or for negotiating a coding to be used in conjunction with the specific characteristics of the network, that is to say in conjunction with the available bandwidth, delay times and jitter that occurs.

The user data comprise information that relates to an individual network user within a specific geographic region of the telecommunications network of a telecommunications network operator. By way of example, data such as this may be:
  registration status of the user and information as to where the currently assumed location of the user or his mobile terminal is, that is to say where this was most recently "seen" in the network; by way of example, this may be identifier of a base station responsible for a specific mobile radio cell;
  available network technologies that provide network coverage and therefore reachability of the user in the region in which the user is currently located, and that provide access to the telecommunications network operated by the mobile radio operator;
  the quality of the various networks and network technologies that, in the vicinity of the user, ensure appropriate access to the network of the mobile radio operator;
  the IP address of the user and/or other identifiers of the user like MSISDN or IMSI, or else other usable information for access-specific authentication processes;
  materials for access-specific authentication processes or, if necessary, materials for central access with the collaboration of a plurality of users from different access locations.

These types of information are updated continuously soon as a user moves within the network. The updated information represents new characteristics that are or can be associated with the user, for example where he was most recently seen within the network, when he was last seen, network coverage aspects, or when the user has moved within the network.

User-related data that are stored in the distributed network register can be localized by using a hash function to convert an identifier associated with the user to a hash value. This so-called "hashed" identity of the user can be used as a key word for a search at any network node that is participating in the distributed network register, in order to find that register node that is responsible for the storage of the network-related user information. One hash function that can be used for DRN is the so-called SHA-1 algorithm (SHA, secure hash algorithm). When using the SHA-1 algorithm, the "hashed" identity is generated either from the MSISDN (mobile subscriber ISDN number) or an alternative identifier such as an e-mail address or a SIP (session initiation protocol) identifier, and the "hashed" identifiers determined by the hash function are distributed uniformly over the entire possible space. However, it would also be possible to use a different algorithm. As soon as this register node that is responsible for the storage of the network-related user data has been found in the distributed network register, this node can be searched by using the hash value, in order to find the information held in this registry node associated to this hash value or to the user respectively.

According to the invention, the distributed network register may be a component of a mobile radio network, with the mobile terminals being formed by mobile terminals that can communicate via the mobile radio network with one another and with external terminals, such as fixed line telephones. For the purposes of the invention, the identifier of a terminal may be any desired numeric or alphanumeric character sequence that uniquely identifies the terminal in the telecommunications network. The identifier is preferably the MSISDN (mobile subscriber ISDN number) associated with a mobile radio terminal. Alternatively, the identifier may be an e-mail address, a SIP address (session initiation protocol), an IP-Address, an IMSI (International Mobile Subscriber Identity) or any other unique identifier.

According to the invention, the decentralized network register is formed by a peer-to-peer network having a multiplicity of decentralized register nodes that are networked with one another and are each associated with one geographic region. By way of example, in the case of cellular mobile radio networks, a geographic region such as this may be one or more mobile radio network cell/cells, that is to say a bounded geographic area in which one or more network node/nodes provide/provides a network access point to the network, in particular the mobile radio network. A network access point such as this may be provided by a base station in a GSM/GPRS mobile radio network (Global System for Mobile Communication, General Packet Radio Service), a UMTS mobile radio network (Universal Mobile Telecommunications System), a WLAN router (Wireless Local Area Network) or a cable-based access network such as DSL (Digital Subscriber line), ISDN, glass fiber or television cable. Because of the locally restricted transmission and reception range of these network access points, there are restricted geographic regions associated with these kind of network nodes.

In order to form the distributed network register, the register nodes contain hash tables in which the identifiers of the terminals, for example the phone numbers of the mobile radio terminal devices are stored as hash values calculated by means of a predetermined hash function, and the network-related user data are stored, associated with these hash values, in the hash table. A hash value uniquely identifies a terminal used in the telecommunications network, on the one hand, as well as a specific memory location for the associated user data within the decentralized network register, on the other hand, as a result of which this user data can be found by means of the hash value in the network register.

The network has at least one first register node that is associated with a geographic region in which a mobile terminal can register for communication via the telecommunications network, and a second register node that is permanently assigned to the terminal and is associated with a different geographic region. The first node may be any desired register node in the network, that is to say located anywhere, via which the terminal can access the network. It is not a specific node in the network. In fact, a register node with which the terminal registers in the network is actually the first register node in the meaning of the invention. In contrast, the second register node is always the same node. Consequently, the second register node always remains the same within the network and is permanently associated with a specific terminal. It should be noted that the first register node may be formed by the second register node. This is the case when the terminal is located in that region that is associated with the second register node being assigned permanently to the terminal.

By way of example, the assignment may be realized at the same time as the allocation of the identifier to the device or to a subscriber. In this case, the association is carried out such that the second register node, or its address within the network, is uniquely evident from the hash value of the identifier of the terminal. By way of example, this association can be achieved by that the last three digits of the hash value indicate to the register node that is permanently assigned to the terminal. This can result in a maximum of 1000 uniquely identifiable register nodes that form the distributed network register and between which all of the user data of terminals that communicate via the telecommunications network are distributed.

For data storage within the decentralized network register, a hash table can first of all be created and held in the second register node, in which hash table the identifier associated with the terminal is stored as a hash value determined by means of a predetermined hash function. If the terminal is located within the geographic region associated with the first register node, it registers with this register node by transmitting its identifier, and the register node determines network-related user data of the mobile terminal on registration and determines a hash value for the identifier by means of the predetermined hash function. The first register node can then use the hash value to determine the second register node and either transmits the network-related user data to this second register node or itself stores this user data in his hash table together with the hash value, and transmit only its own address in the peer-to-network in the second register node, so that the register node that is permanently assigned to the terminal contains only a pointer to that register node that currently holds the user data due to the fact the terminal has currently registered at this register node. The second register node then associates the transmitted network-related data or the transmitted address of the first register node with the hash value in its hash table, and stores this, so that the user data can be found when a search is requested within the network register.

A request of a system for the current network-related user data of the terminal can be made to a third register node by transmitting the identifier associated with this terminal. A request such as this may, for example, may be a call from another telecommunication subscriber who or a terminal that wishes to reach that terminal. The system may be a switching center via which the call is switched. Alternatively, the requesting system may be a mobile radio terminal. If the system is resident in the same network as the terminal to be reached, this can be referred to as an internal request. If the requesting system is, in contrast, is a system resident in a different network, that is to say a system that is not resident in the same network as the called terminal, for example a landline telephone or a switching center that wishes to set up a call to the terminal originating from a foreign telecommunications network, then this can be referred to as an external request.

The internal or external request can in principle be made to any register node in the network. However, in the case of an external request, this register node is preferably a node that is not associated with any geographic region, but in fact is arranged in the peer-to-peer network without any such association. Furthermore, in the case of an internal request, the register node is that register node that is associated with that region within which the requesting system, i.e. the requesting mobile radio terminal is located and is provided access to the network. This means that the third register node may be any register node in the network, and in particular may be identical to the first or the second register node. The expression used here as "third register node" is only for linguistic distinction.

When the identifier associated with the terminal to be reached is transmitted to the third register node, the latter can determine the hash value of the identifier by means of the predetermined hash function, and can determine the second register node assigned to the terminal, from the hash value. It can then check the information associated with this hash value in the hash table of the second register node by transmitting the hash value to the second register node and requesting the information stored in association to this hash value in the second node. The information stored in association to this hash value can be user data or the address of the first register node that holds these user data. By this, it can obtain the information as to whether the called terminal is currently registered in the telecommunications network and, if it is registered, can obtain the information as to the region, in particular the mobile radio cell, in which the terminal is currently located. Alternatively, the third register node can transmit the identifier directly to the second register node that then itself determines the hash value.

If the information stored in the second register node relating to the hash value is network-related user data, this data can be transmitted to the requesting system, thus allowing a communication link to be set up from the system to the terminal to be called. If the information associated with the hash value in the second register node is, in an alternative embodiment an address of a further register node that contains the requested network-related user data, it is possible to check the user data in this register node.

If the terminal has most recently registered with the first register node, its address is correspondingly stored, associated with the hash value, in the hash table of the second register node. The second register node can then transmit the address of the first register node to the third register node that then checks the user data in the first register node. This can be done by the third register node transmitting the identifier of the terminal, or straight away transmitting the hash value of the identifier to the first register node, as a result of which this first register node can find in its hash table the table entry that is correspondingly associated with this hash value, that is to say the network-related user data of the terminal. If only the identifier of the terminal is transmitted to the first register node, the first register node calculates the hash value of the identifier itself. The network-related user data is then transmitted to the third register node that passes this on to the requesting system. In an alternative embodiment the second register node can forward the request of the third register node to the first register node that in return transmits the network-related user data back to the second or directly to the third register node. The latter would require the second node to provide the address of the third node to the first node. If the terminal moves out of the region associated with the first register node into another region for which a different register node is responsible, the terminal correspondingly registers with this register node by transmitting the identifier. On registration, this register node then determines current network-related user data of the mobile terminal and determines a hash value for identifier, in accordance with the predetermined hash function. This new register node can then store the specific hash value together with the current network-related user data in a hash table held in it, uses the hash value to determine the second register node that is assigned to the terminal, and can transmit to this second register node its address that then stores the address of the new register node, associated with the hash value, in its hash table. Alternatively, the new register node uses the hash value to determine the second register node that is assigned to the terminal, and transmits all the network-related user data to this second register node that then stores the user data, associated with the hash value, in its hash table.

In the case of the first embodiment, the new register node has all the network-related user information of the terminal while, in contrast, in the second embodiment, the register node that is permanently assigned to the terminal has all the network-related user data. As, in the second embodiment, one and the same register node always holds the current user data, this procedure can be referred to as a static usage scheme. As, in the first embodiment, a different register node is responsible for the management of the network-related user data, changing depending on the geographic region, this procedure can be considered to be a dynamic usage scheme.

According to the invention, the network-specific user data preferably comprises the registration state of the terminal, its location in a geographic region, and/or information relating to the availability of access networks to the telecommunications network within the region, that is to say information such as network coverage, network strength or available network technology in the vicinity of the terminal.

The telecommunications network according to the invention for mobile telecommunication for carrying out the specified method has a network register in which user data for the terminals, relating to identifiers of mobile terminals for communication via the telecommunications network are stored, wherein the network register is in the form of a peer-to-peer network with a multiplicity of decentralized register nodes that are networked with one another and are each associated with one geographic region, wherein hash tables are held in the register nodes, in which hash tables the identifiers of the terminals can be stored as hash values, and the user data is stored associated with these hash values. The telecommunications network for carrying out the method comprises at least one first register node that is associated with a geographic region and with which a mobile terminal can register for communication via the network, and a second register node that is permanently assigned to the terminal and is associated with a different geographic region, wherein a hash table is held in the second register node, in which hash table an identifier associated with the terminal is stored as a hash value determined by means of a predetermined hash function, the first register node is designed such that the terminal can register with it by transmitting the identifier, when it is located in the first region, and the first register node is configured to determine network-related user data of the mobile terminal on registration, and to determine a hash value of the identifier by means of the predetermined hash function, to determine the second register node from the hash value and either to transmit the network-related user data to this second register node, or to store this user data itself in its hash table together with the hash value, and to transmit only its own address in the network to the second register node, and wherein the second register node is configured to store the network-related data or the address of the first register node, associated with the hash value, in its hash table.

A register node may be formed either by a data node or by a localization node, or by a node combined form data node and localization node. The embodiment of the register node as a data node on the one hand and a localization node on the other hand has the advantage that these nodes can be specialized for specific tasks. In contrast, combined nodes have the advantage that they act technically in the same way and with the same function from a network's point of view, thus simplifying the complexity of the technical implementation of the method and the DNR according to the invention in the peer-to-peer network set up for this purpose.

Preferably, each region covered by the network can be associated either with a data node and a localization node, or alternatively with a combined node. The network register may accordingly either consist exclusively of combined nodes, exclusively data nodes and localization nodes, or alternatively may also be implemented using a heterogeneous structure, that is to say using a structure in which one region or a plurality of regions is or are in each case associated with one combined node, and the other region or regions is or are in each case associated with data nodes and localization nodes. A data node is distinguished in that the user data that is associated with a terminal is stored in said data node, with this storage being carried out associated with the hash value of the identifier of this terminal. Furthermore, a localization node is distinguished in that it does not manage any user data but in fact contains the address, associated with a hash value, of that data node that is managing the user data associated with the hash value.

The register nodes may be provided as autonomous devices within the network. However, alternatively, they may be arranged within network elements in the network, such as a base station, an antenna controller, a WLAN router or other servers or gateways of the network operator.

In order to accept requests for the current network-related user data, a specific register node or all of the register nodes in the network can be designed to receive a request of a system for the user data of a specific terminal, and to carry out a search for this user data within the network, using the method steps described above.

BRIEF DESCRIPTION OF THE DRAWING

Further features and advantages of the method according to the invention and of the network according to the invention will be explained in more detail in the following text using exemplary embodiments and with reference to the attached figures, in which.

SPECIFIC DESCRIPTION OF THE INVENTION

Figure 1:
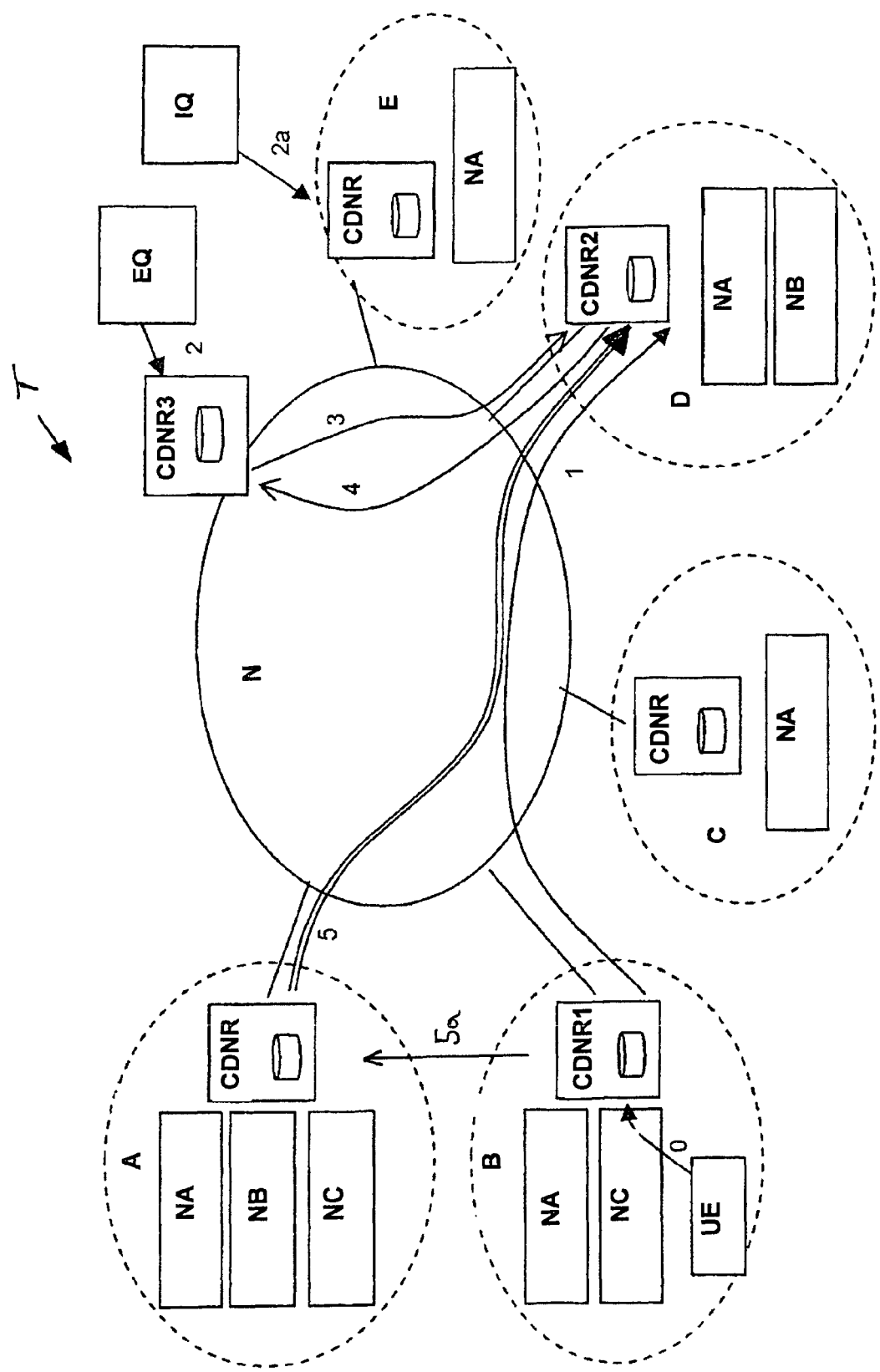
FIG. 1: shows a schematic illustration of the interaction of the individual network components in a static usage scheme.
Figure 2:
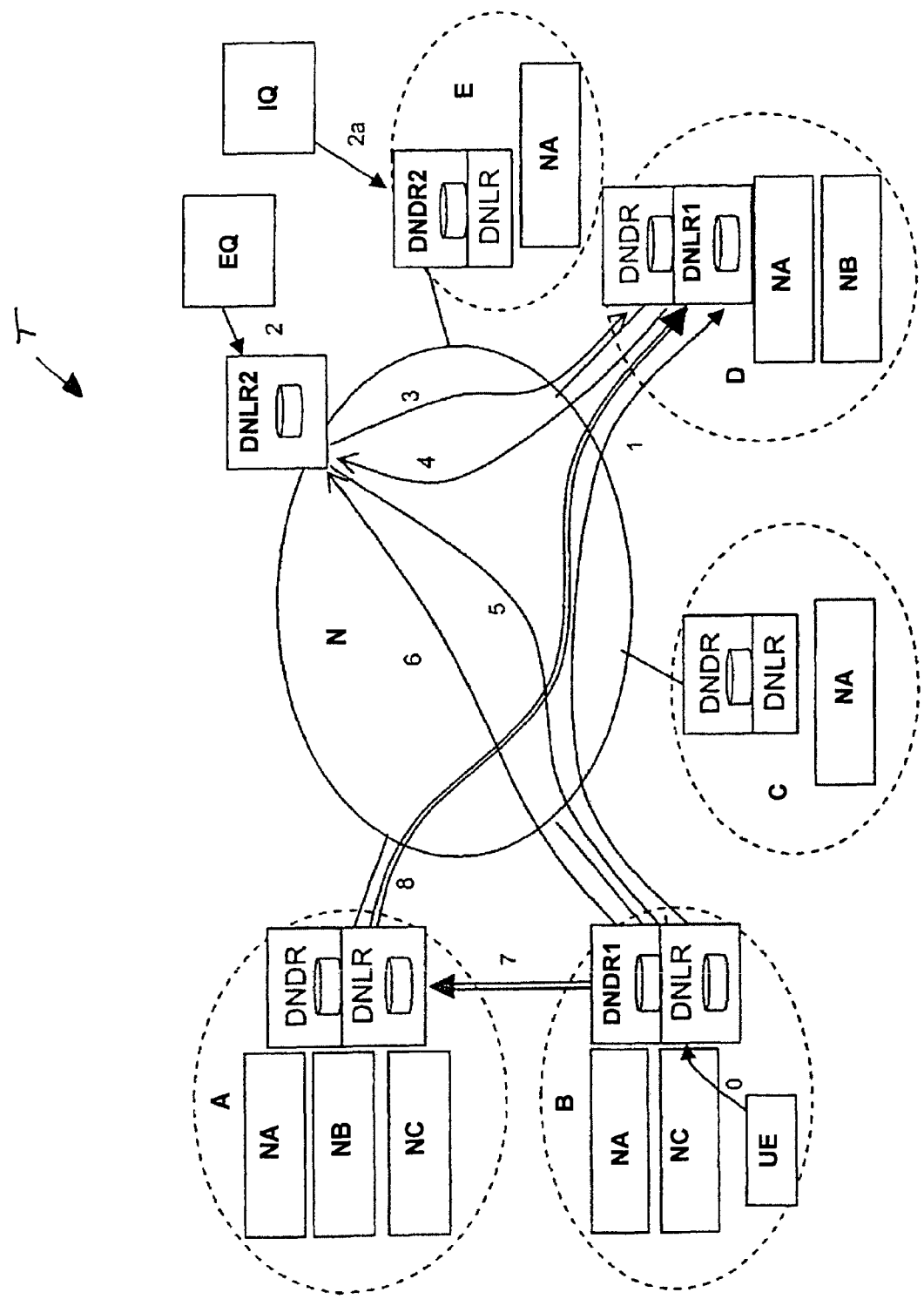
FIG. 2: shows a schematic illustration of the interaction of the individual network components in a dynamic usage scheme.

FIG. 1 shows a schematic illustration of a telecommunications network T having a peer-to-peer network N according to the invention, in which a decentralized network register DNR (distributed network register) is formed by a plurality of register nodes CDNR (combined distributed network registry) that are formed from a combination of data nodes DNDR (distributed network data registry) and localization nodes DNLR (distributed network location registries), compare FIG. 2.

By way of example, FIGS. 1 and 2 show five regions A, B, C, D, E, each of which is associated with a register node CDNR, CDNR1, CDNR2. It should be noted that, merely by way of example, FIGS. 1 and 2 show only five regions A, B, C, D, E, while considerably more regions may exist in an actual telecommunications network T.

The register nodes CDNR, CDNR1, CDNR2 are technically equivalent and have the same function. They are connected to the network N and are connected to one another, as a result of which the network N represents a peer-to-peer network. The geographic region A, B, C, D, E associated with a register node is defined by the reception range of an access point NA, NB, NC to the telecommunications network T. The geographic dimensions of a region A, B, C, D, E may differ depending on the available access point or points. The access points NA, NB, NC form accesses to networks with different technologies that are operated jointly by one telecommunications network operator. By way of example, a first network may be a GSM/GPRS mobile radio network, with the access points NA to this network being formed by base stations the coverage area of which form the cells of this GSM/GPRS mobile radio network. By way of example, a second network may be a mobile radio network of the UMTS Standard, with the corresponding access points NB being formed by base stations that cover the cells of this UMTS mobile radio network. Furthermore, a third network may be formed by an Ethernet, an access point NC to this network being a WLAN router, for example. Other cable-based transmission media may also be used as alternatives, such as DSL, ISDN, glass-fiber cable or television cable. Each of the access points NA, NB, NC using different network technologies, mentioned for illustrative purposes, is a part of the telecommunications network operated or contracted by the telecommunications network operator, and in order to set up communication links to terminals for the user information stored in the register nodes CDNR, CDNR1, CDNR2. Further wireless network technologies that can be used to set up access points to the telecommunications network T, may be for example CDMA2000 (Code Division Multiple Access), LTE (Long Term Evolution), or WiMAX (Worldwide Interoperability for Microwave Access). The accesses NA, NB, NC relate to networks using different technologies that can be used by the operator of the telecommunications network T. These accesses NA, NB, NC may be provided in one or more or all the regions A, B, C, D, E of the telecommunications network. The register nodes CDNR, CDNR1, CDNR2 associated with one region contain databases for storage of the network-related user data of the mobile terminals. Hash tables, in which data in the form of a data pair is stored, are set up in the databases. The first element of the data pair is in each case a hash value that is formed in accordance with a predetermined hash function from an identifier associated with a specific terminal, that is to say for example from the call number of a mobile radio. The second element of the data pair may either be a data object with the network-related user data or an address of another register node, in which the user data is stored, depending on whether a static or dynamic usage scheme is used for carrying out the method according to the invention. This will also be illustrated in the following text.

In comparison to FIG. 1, FIG. 2 shows one embodiment variant of the network according to the invention with specific data and location register nodes DNDR, DNLR. In this embodiment, each region A, B, C, D, E is associated with a data node DNDR, DNDR 1, DNDR 2 on the one hand and with a localization node DNLR, DNLR 1 on the other hand. These register nodes also are networked with one another and form a peer-to-peer network N, in which a distributed network register DNR is implemented.

A data node DNDR, DNDR 1, DNDR 2 is an element of the distributed network register DNR that is responsible for the storage of information relating to a specific user. User kind of data comprise, for example, the registration status of a terminal and the current or most recent location of a terminal, preferably also information as to which network technologies NA, NB, NC are in principle and in fact available in the vicinity of the terminal, and preferably in what network quality.

A localization node DNLR, DNLR1, DNLR2 is also an element of the distributed network register DNR. It is used to determine the current or most recent location of a terminal UE within the network. A localization node DNLR, DNLR1, DNLR2 can carry out two functions. According to a first function, it is able to receive a request EQ, IQ for network-related user data, to carry out a search for this user data within the network, and to provide the requested user data. According to a second function, a localization node DNLR, DNLR 1 may also be able to store the address of a data node DNDR, DNDR1, DNDR2 within which, in turn, the network-related user data is stored. It should be noted that the localization nodes DNLR need not necessarily all have a storage capability such as this. In this case, the functionality of a localization node DNLR is reduced to the first function. By way of example, a localization node DNLR2 such as this may be set up without being associated with a geographic region A, B, C, D, E in the network N, which node is responsible for receiving external requests EQ for user data, searching for this user data, and correspondingly providing it.

The user information that is stored in the data nodes DNDR, DNDR1, DNDR2 and the localization nodes DNLR, DNLR1 is stored using distributed hash tables. This user data is stored in a localization node DNLR, DNLR1 in the form of a data pair <hash value of the identifier; address of the data node>. In contrast, the user data is stored in the data nodes DNDR, DNDR1, DNDR2 in the form of a data pair <hash value of the identifier; user data>. The user data is likewise stored in the combined nodes CDNR, CDNR1, CDNR2 in the form of a data pair <hash value of the identifier; user data>. By way of example, a call number in accordance with the E.164 Standard, a SIP address and/or an e-mail address that uniquely identifies a mobile terminal, may be used as an identifier. The hash value, also referred to as "hashed identity" or "hashed identifier" is in contrast a numeric or alpha-numeric character string that is derived from the identifier using a hash function. The length and the format of the identifier are normalized by means of the hash function.

The network register DNR according to the invention may be used in two different embodiment variants, a static usage scheme and a dynamic usage scheme. According to the static usage scheme, all the register nodes of the network register can store network-related user data. In this embodiment, the register nodes are always in the form of combined nodes, that is to say those network nodes that have the functionality of a data node and of a localization node. Furthermore, in this static embodiment of the method according to the invention, the data node that manages specific user data is the same node as the localization node for this user. The static embodiment can accordingly be implemented using the telecommunications network T shown in FIG. 1.

In the alternative dynamic embodiment, which is not shown, some register nodes may only be in the form of localization nodes DNLR, others only in the form of data nodes DNDR, and in turn others in the form of combined nodes CDNR. In this embodiment, a data node DNDR that contains specific user data need not necessarily be identical to that data node DNDR that is assigned to the user.

By way of example, in FIG. 2, a first register node is a data node DNDR1 with which a terminal UE is registered for the time for which it remains within the region B. On registration, network-related user data is stored in this data node DNDR1. In contrast, one register node is permanently assigned to the terminal UE as a localization node DNLR1, and is responsible for localization of the terminal UE and for localization of the user data associated with the terminal UE. In FIG. 2, this localization node DNLR1 is associated with the region D. The register node DNLR1 that is responsible for the localization of terminal UE and the register node DNDR1 managing the current user data for the terminal UE are in this case not the same node while, in contrast, in the case of the static embodiment shown in FIG. 1, one and the same register node CDNR2 of the region D is responsible for the localization of terminal UE and for the storage and management of its user data.

The reference symbols EQ and IQ relate to systems that make a request for user-specific information. A system such as this may, for example, be a switching center that receives a call to a terminal UE that is resident in the telecommunications network T. External request EQ relates to a request from a system that is outside the telecommunications network T and makes use of the decentralized register node in the distributed network register to obtain user-specific network data. In contrast, an internal check IQ means a request from a system that is located within the telecommunications network T and likewise makes use of the decentralized register node in the distributed network register in order to gain access to user-specific network data.

The method steps for management of the decentralized network register DNR according to the invention will be described in the following text both for the static embodiment variant and for the dynamic embodiment variant:

Static Usage Scheme:

The procedure for operating the network register according to the invention will be explained on the basis of the arrows in FIG. 1, provided with reference symbols. As soon as a user of the telecommunications network T activates his mobile terminal UE, it is registered within the telecommunications network T. This is indicated by the arrow 0 in FIG. 1, in which case the user is currently located in region B and registers with the combined register node CDNR1 that is responsible for this region. On registration, the terminal UE transmits its identifier via network access point NC of region B to the combined register node CDNR1. The register node CDNR1 identifies a new mobile terminal UE and determines a hash value for the identifier associated with this terminal UE. Furthermore, the register node CDNR1 identifies that register node CDNR2 is responsible for the storage of the network-related user data, and provides to this register node CDNR2 the information obtained during registration of the terminal, in particular registration status and registration location. This process of passing information is indicated by the arrow 1. In the illustrated case, the combined register node CDNR2 of the region D is assigned to the terminal UE and is responsible for the storage of information of the terminal UE. After registration, the combined register node CDNR2 of the region D that is responsible for the terminal UE, has all the user-specific information, such as registration status, location, the network availability and network coverage in the immediate vicinity of the terminal UE.

If an internal or external system makes a corresponding internal request IQ or external request EQ for user data of a specific user with a specific identifier, this system sends a corresponding request together with this identifier to a combined register node CDNR3. This register node CDNR3 is not associated with any geographic region. The external request EQ is indicated by the arrow 2 in FIG. 1, the internal request IQ with the arrow 2a. The combined register node CNDR3 receives the request and uses the identifier of the user terminal to calculate a hash value. As soon as this hash value has been determined, the requesting register node CDNR3 sends a request for the specific user data to the appropriate combined register node CDNR2, as is illustrated by the arrow 3. The information which register node is responsible for the management of the specific user data for the terminal UE is determined by the requesting register node CDNR3 from the calculated hash value. The combined register node CDNR2 that is responsible for the terminal UE then sends the requested user data to the requesting register node CDNR3, as illustrated by the arrow 4. By this, register node CDNR3 receives the information that the terminal UE is registered and can be reached in region B via register node CDNR1. The register node CDNR3 can then set up a call or send a message to the terminal UE in region B.

When the user moves with his terminal UE from the region B into another region A, it is necessary to update his location in the user data that is stored in the responsible register node CDNR2. This is indicated in FIG. 1 by the arrow 5, the arrow 5a illustrating the movement of the terminal UE from the region B into the region A.

The Dynamic Usage Scheme:

The dynamic use of the network register DNR according to the invention will be explained in the following text with reference to FIG. 2. FIG. 2 illustrates only one localization node DNLR 2 that is not associated with any region and that is also not associated with any data node DNDR. In the case of an actual telecommunications network T, there may also be a plurality of such localization nodes DNLR2.

As soon as a user activates his mobile terminal UE, it is registered within the telecommunications network T under provision of its identifier. This is represented in FIG. 2 by the arrow 0, in which case, by way of example, the terminal is located in region B that is associated with a data node DNDR1. This data node DNDR1 that detects the new user, produces a new entry in its database with all the network-related user data for this specific terminal UE determined during the registration process. In addition, this data node DNDR1 uses the identifier associated with the terminal UE to calculate a hash value, stores it in association with the user data in its database and transmits the information to the localization node DNLR1 that he, the data node DNDR1 of the region B, is responsible for the user terminal UE and that he has stored the network-related user data of the terminal UE. To do this, the data node DNDR1 transmits its address within the peer-to-peer network N to the localization node DNLR1. This is illustrated by the arrow 1. The localization node DNLR1 then stores the address associated with the hash value of the identifier of the terminal in its database.

After registration, the data node DNDR1 of the region B is responsible for management of the user data. This register node DNDR1 has all the user data of the specific terminal UE, such as the registration status and location and/or the network availability and network coverage within the immediate vicinity of the terminal UE. That register node DNLR1 that is responsible for the hash value of the identifier of the terminal UE, in this case the register node for the region D, in contrast, has an entry in its hash table that the data node DNDR1 of the region B is managing the user data for the terminal UE.

If an external system makes a request EQ or an internal system makes a corresponding request IQ for specific user data of the terminal UE, a corresponding request is sent to a localization node DNLR2, see the arrow 2, or to a data node DNDR2, see the arrow 2a. The process will be explained further in the following text starting from the localization node DNLR2. However, it can be applied analogously on the basis of the data node DNDR2. The localization node DNLR2 receives the external request EQ and calculates a hash value relating to the identifier of the terminal UE whose user data has been requested. As soon as the localization node DNLR2 has this hash value, it makes a request to that localization node, here DNLR1 that is responsible for the hash value of the terminal UE, requesting the address of that data node DNDR1 that is in turn currently responsible for the management of the requested user data. This is illustrated by the arrow 3.

The localization node DNLR1 that is responsible for the hash value, receives the request and returns the address of that data node DNDR1 within the peer-to-peer network N that is currently responsible for the management of the network related user data of the terminal UE. This is illustrated by the arrow 4 in FIG. 2.

As soon as the requesting localization node DNLR2 knows where it can obtain the requested user data, it sends a request for the user data to the data node DNDR' being currently responsible for the management thereof, see the arrow 5. This data node DNDR1 then returns the requested user data to the requested localization node DNLR2, see the arrow 6. As soon as the user moves with his mobile terminal UE from the original region to a new region A, see arrow 7, it is necessary to transmit his network-related user data to a new data node, that is to say to the data node DNDR that is responsible for the new region A. At the same time as this data transmission, it is necessary to update the address information in the localization node DNLR1 that is responsible for the localization of the user data and the data node DNDF holding this data. This is illustrated by the arrow 8 in FIG. 2.

The described mechanism ensures that, when a request is made for specific use data, the information as to where the user data is currently stored and the information associated with it as to where the mobile terminal UE of the user is currently located or was most recently located is always stored in the same localization node DNLR1. In contrast, the network-related user data may be located in a changing form in any given data node DNDR in the peer-to-peer network N, depending on the region A, B, C, D, E in which the terminal UE is currently located. In consequence, the user data can migrate between the data node DNDR in the network N in the described dynamic usage scheme.

The invention claimed is:

1. A method for operating a telecommunications network for mobile telecommunication, wherein
   the network has a network register in which identifiers of mobile terminals and network-related user data of the terminals are stored,
   the network register is formed from a peer-to-peer network having a multiplicity of decentralized register nodes networked with one another and each associated with and responsible for a respective geographic region,
   the network holds in the register nodes hash tables storing the identifiers of the terminals as hash values and the user data associated with these hash values, and
   the peer-to-peer network has
      at least a first register node associated with and responsible for a first geographic region and at which a mobile terminal can register for communication via the telecommunications network, and
      a second register node permanently assigned to the terminal and associated with and responsible for a second geographic region,
   the method comprising the step of:
      holding in the second register node a hash table in which the identifier associated with the terminal is stored as a hash value determined by a predetermined hash function,
      the terminal registering with the first register node by transmitting the identifier, when it is located in the first geographic region,
      the first register node determining network-related user data of the mobile terminal on registration and determining the hash value for that identifier by the predetermined hash function,
      the first register node using the hash value to determine the second register node and either transmitting the network-related user data to the second register node or itself storing the network-related user data in its hash table together with the hash value and transmitting only its own address in the network to the second register node,
      storing the network-related user data or the address of the first register node associated with the hash value in the hash table of the second register node,
      a system requesting the current network-related user data of the terminal at a third register node by transmitting the identifier associated with the terminal,
      the third register node determining the hash value of the identifier by the hash function, using the determined hash value to determine the second register node assigned to the terminal, and requesting the information associated with the determined hash value in the hash table of the second register node,
      if the information is an address of a further register node, requesting the network-related user data at the further register node and, after receipt, transmitted it to the requesting system.

2. The method as claimed in claim 1, wherein, when the terminal moves into a different region, the terminal registers with the register node responsible for the different region and transmits the identifier to the responsible register node, the responsible register node determines current network-related user data of the mobile terminal on registration, and determines a hash value for the identifier by means of the predetermined hash function, and then
   either stores the determined hash value together with the current network-related user data in a hash table held in it, uses the hash value to determine the second register node assigned to that terminal and transmits its address to the second register node, which then stores the address, associated with the hash value, in its hash table, or
   uses the hash value to determine the second register node assigned to that terminal and transmits the network-related user data to the second register node, which then stores the user data, associated with the hash value, in its hash table.

3. The method as claimed in claim 1, wherein the network-specific user data comprises the registration state of the terminal, its location in a specific geographic region, and/or information relating to the availability and technology of access points to the telecommunications network within the region.

* * * * *